US011030543B1

(12) United States Patent
Marino (10) Patent No.: US 11,030,543 B1
(45) Date of Patent: Jun. 8, 2021

(54) SYSTEMS AND METHODS FOR DETERMINING LIKELIHOOD OF INCIDENT OCCURRENCE

(71) Applicant: Safe-esteem, Inc, Miami, FL (US)

(72) Inventor: Filippo Marino, Miami, FL (US)

(73) Assignee: Safe-esteem, Inc, Miami, FL (US)

( * ) Notice: Subject to any disclaimer, the term of this patent is extended or adjusted under 35 U.S.C. 154(b) by 954 days.

(21) Appl. No.: 15/676,766

(22) Filed: Aug. 14, 2017

Related U.S. Application Data

(63) Continuation of application No. 15/141,670, filed on Apr. 28, 2016, now Pat. No. 9,734,456.

(51) Int. Cl.
| | | |
|---|---|---|
| *G06F 1/00* | (2006.01) |
| *G06N 5/00* | (2006.01) |
| *G05B 15/02* | (2006.01) |
| *G06N 7/00* | (2006.01) |
| *H04W 4/021* | (2018.01) |
| *H04W 4/029* | (2018.01) |
| *G06F 16/29* | (2019.01) |
| *G06F 16/2457* | (2019.01) |

(52) U.S. Cl.
CPC ....... *G06N 7/005* (2013.01); *G06F 16/24575* (2019.01); *G06F 16/29* (2019.01); *H04W 4/021* (2013.01); *H04W 4/029* (2018.02)

(58) Field of Classification Search
CPC ... G06N 7/005; G06F 16/29; G06F 16/24575; H04W 4/029; H04W 4/021
USPC ...................................................... 706/1–62
See application file for complete search history.

(56) References Cited

U.S. PATENT DOCUMENTS

| | | | | |
|---|---|---|---|---|
| 9,734,456 B1* | 8/2017 | Marino | ............ | G06F 16/24575 |
| 2003/0196097 A1* | 10/2003 | Korosec | ................... | G07C 9/22 |
| | | | | 713/185 |
| 2013/0183924 A1 | 7/2013 | Saigh | | |
| 2015/0120015 A1* | 4/2015 | Fadell | ................ | G06Q 10/0631 |
| | | | | 700/90 |
| 2015/0169349 A1 | 6/2015 | Joffe | | |

(Continued)

*Primary Examiner* — Brandon S Cole
(74) *Attorney, Agent, or Firm* — Esplin & Associates, PC (57) ABSTRACT

Determination of a user-specific likelihood of incident occurrence at a geographic location may be performed. User information, historical incident information, contextual information, and/or other information may be obtained. User information may include user demographic information, user behavior information, user social information, and/or other user related information. Historical incident information may include data relating to crime, mortality, injury, morbidity rates and may be obtained from local law enforcement, local Departments of Motor Vehicles, national security agency such as the Federal Bureau of Investigation, foreign security agency such as the Central Intelligence Agency, international criminal policy organization such as Interpol, national public health agency such as Center for Disease Control, international public health agency such as World Health Organization and/or other sources. Contextual information may include information about events that have previously occurred at or near user's current geographic location. Determination of a user-specific likelihood of incident occurrence may be performed by analyzing collected sets of user data, historical incident data, and contextual information obtained from various sources to create a single incidence likelihood indicator.

22 Claims, 4 Drawing Sheets

(56) References Cited

U.S. PATENT DOCUMENTS

2016/0019465 A1 1/2016 Milton
2018/0033006 A1* 2/2018 Goldman ............ H04L 63/1408

* cited by examiner

| | | | |
|---|---|---|---|
| Geographic Location = 300 | | | |
| Time = 301 | | | |
| Historical Incident Information = 302 | | | |
| Contextual Information = 303 | | | |
| | | | |
| User 1 | User 2 | User 3 | User 4 |
| 18 | 25 | 38 | 35 |
| Male | Female | Male | Female |
| African-American | Caucasian, blond, blue eyes | African-American | Caucasian |
| 6'2" 210 lbs. | 5'6" 125 lbs. | | |
| Unemployed | Bartender | M.D. OBGYN | Recently returned from volunteer mission in Cameroon |
| Elevated heart rate | | | |
| Member of "Black lives matter" Facebook group | Member of "Fitness & Diet" Facebook group | | Announced on Twitter that she is expecting |
| Walking south on 42nd street | Walking west on 7th Avenue | Driving south on 42nd street | Walking south on 42nd street |
| | | Married, 2 kids | |
| | | Hobbies – car racing | Married |
| | | | Often shops online |
| Likelihood of Incident Occurrence = 90% | Likelihood of Incident Occurrence = 65% | Likelihood of Incident Occurrence = 45% | Likelihood of Incident Occurrence = 25% |
| | | | |

SYSTEMS AND METHODS FOR DETERMINING LIKELIHOOD OF INCIDENT OCCURRENCE

CROSS-REFERENCE TO RELATED APPLICATIONS

This application is a continuation of U.S. patent application Ser. No. 15/141,670, filed on Apr. 28, 2016, the contents of which are incorporated by reference herein.

FIELD

The disclosure relates to systems and methods for determining a user-specific likelihood of incident occurrence at a geographic location.

BACKGROUND

Many mobile devices now have the capability of recording location and other information. Having a complete record of when and where the user goes is useful for a variety of applications, including incident occurrence alerts, recommendation systems, lifelogging, gaming, and goal tracking. Multiple data sources exist for storing and tracking criminal, health, safety, and other relevant information associated with certain geographic locations and certain demographics. The information may often be of widely different types and scattered across various physical systems belonging to different organizations and/or individuals.

SUMMARY

The disclosure relates to determining a likelihood of incident occurrence for the geolocation, the time, and the user and presenting it to users on client computing devices, in accordance with one or more implementations. The determination may be performed by analyzing geolocation, user information, historical incident information, and contextual information. The geolocation information may be obtained from the user client computing device. User information, including user demographic characteristics, user behavioral information, user social information, and/or other information may be obtained as user input or obtained from various sources. Historical incident information may be obtained from various sources and reflect information for incidents that have previously occurred at or near user geographic location including demographic information. Contextual information may include information about events that are occurring or have previously occurred at or near user geographic location and may be obtained from various sources.

In some implementations, system configured to determine a likelihood of incident occurrence for the geolocation and the user may include one or more servers. The server(s) may be configured to communicate with one or more client computing device according to a client/server architecture. The users of the system may access the system via client computing devices. The server(s) may be configured to execute one or more computer program components. The computer program components may include one or more of a geolocation component, a user component, an incident component, a contextual component, a determination component, a presentation component, and/or other components.

The geolocation component may be configured to obtain geolocation information for the likelihood of incident occurrence. Geolocation information may include determination of a real-world position or geographic location of a user. The geolocation component may be configured to use client computing device to determine a geographical location of a user based on one or more of signal strength, GPS, cell tower triangulation, Wi-Fi location, receipt of real-world location from the server, and/or other input. In some implementations, user movements may be tracked using a geography based transmitter on the client computing device. Future location may be a location the user is intending on visiting sometime at a later time on the same date. Future location may be a location the user is intending on visiting sometime at a later date. In some implementations, the geolocation component may be configured to obtain user's speed and/or direction of traveling. Future location may be obtained using user's speed and/or direction of traveling.

The user component may be configured to obtain user demographic characteristics. The user demographic characteristics may include user's age, sex, race, national original, religion, marital status, family status, sexual orientation, height, weight, occupation, career, education level, interests, hobbies and/or other characteristics. The user component may be configured to obtain user demographic characteristics as stated information from the user, from an administrator, obtained from analysis of publicly available information associated with the user (e.g., public records, social media, and/or other sources), determined based on behavioral and/or demographic information related to the user, and/or other sources of demographic characteristics.

The user component may be configured to obtain user behavioral information at a geographic location. User behavioral information may include information about user activities both online and offline. For example, user's online behavior may include sites visited, apps downloaded, or games played. User's offline behavior may include venues visited, mode of transportation used, speed of traveling, among other. User behavioral information may be determined based on input obtained from user's schedule, by inference from location (for example, a user's location may indicate a user is in or near a stadium) and/or user's calendar events.

The user component may be configured to obtain user social information. Social information may include information related to user's profile stored in connection with user's account with a social networking system. User profile may include information provided by the user and information gathered by various systems, including the social networking system, relating to activities or actions of the user.

The incident component may be configured to obtain historical incident information for incidents that have previously occurred at or near user geographic location. Historical incident information may include information about incidents that have previously occurred at or near user geographic location including frequency of occurrences, duration, outcome, type of users involved, time(s) of occurrence, and/or other specific information characterizing historical incidents. The incident component may be configured to obtain historical incident information from a variety of sources. The Incident component may be configured to obtain historical incident information as stated information from the user, from an administrator, obtained from analysis of publicly available information associated with the geographic location (e.g., public records, social media, and/or other sources), and/or other sources of historical incident information.

The contextual component may be configured to obtain contextual information describing events occurring at or near user geographic location. Contextual information may include information about events that have previously occurred at or near user geographic location. Contextual information may include information about events that occur on an individual basis. Contextual information may include information about events that occur periodically, regularly, and/or sporadically. The contextual component may be configured to obtain contextual information as stated information from the user, from an administrator, obtained from analysis of publicly available information associated with the geographic location (e.g., public records, social media, and/or other sources), determined based on behavioral and/or demographic information related to the user, and/or other sources of contextual information.

The determination component may be configured to determine a likelihood of incident occurrence for a user at a certain geographic location by analyzing information obtained by the geolocation component, the user component, the incident component, and the contextual component.

The determination analysis performed by the determination component may be configured to utilize a variety of analytical techniques to analyze collected sets of user data, historical incident information, and contextual information obtained from various sources to create a single incidence likelihood indicator. The determination component may be configured to determine a likelihood of incident occurrence using Bayesian-type statistical analysis to calculate the incidence likelihood indicator. The determination component may be configured to assign specificity, relevance, confidence and/or weight to every one of geographic information, user information, historical incident information, and contextual information based on the relevance and relationship between each piece of information to one another. The assignment of these weight factors may be used in determination of user-specific likelihood results.

The determination component may be configured to determine location-based likelihood indicators associated with the individual users based upon user information, historical incident data, and relevant contextual information. The likelihood indicators may quantify a likelihood of negative incident occurrence to individual users at a certain geographic location. In some implementations, the likelihood indicators may quantify a likelihood of occurrence of certain types of negative incidents to individual users at a certain geographic location.

The presentation component p may be configured to effectuate presentation of an incidence likelihood indicator to the user, the incidence likelihood indicator reflecting the likelihood of incident occurrence for the geolocation and the user. The presentation component p may be configured to use the client computing device(s) to present the incidence likelihood indicator to the user.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
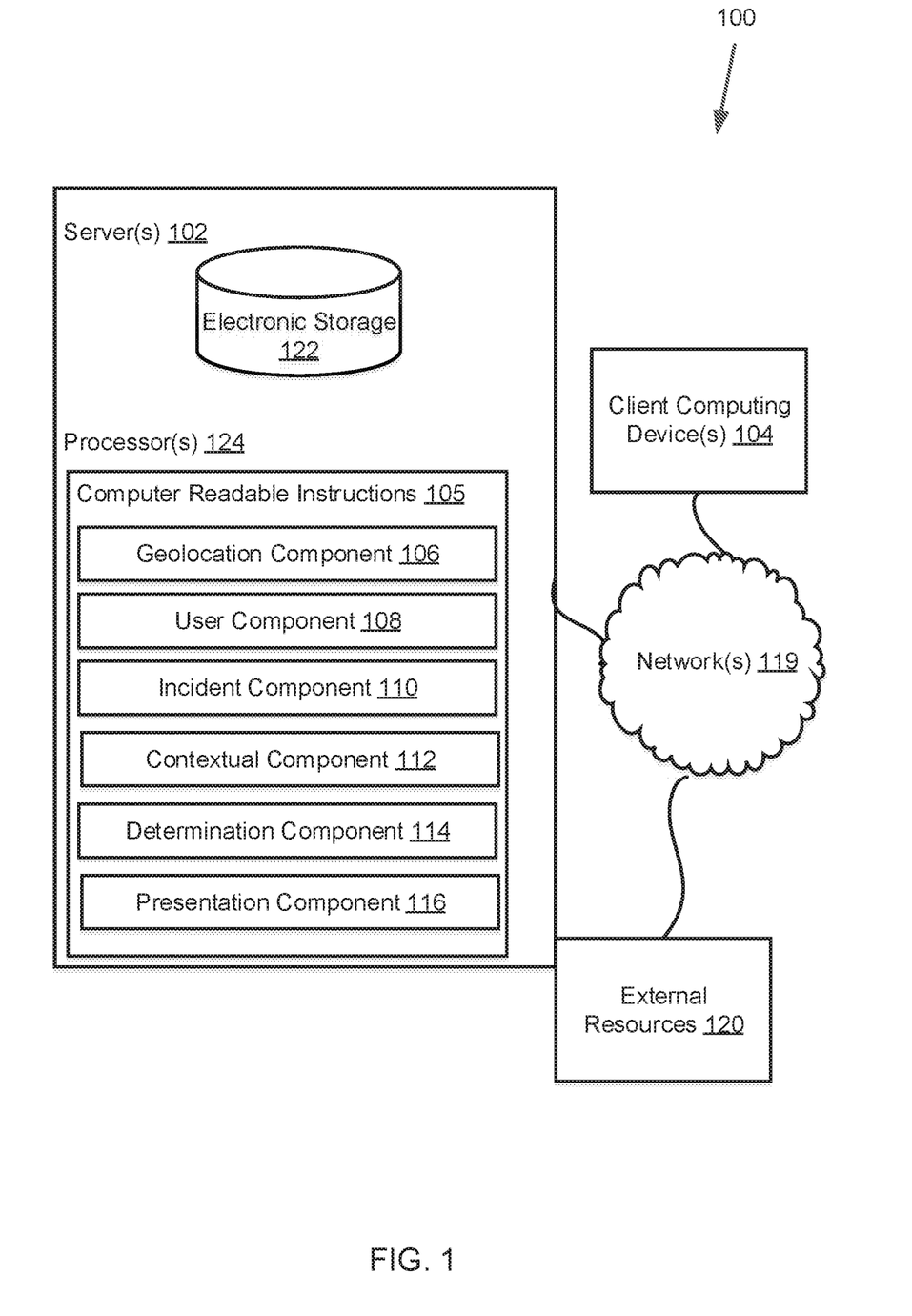
FIG. 1 illustrates a system configured for determining a likelihood of incident occurrence for a user at a geographic location, in accordance with one or more implementations.

FIG. 1 illustrates a system configured for determining a likelihood of incident occurrence for the geolocation and the user and presenting it to users on client computing devices, in accordance with one or more implementations. As is illustrated in FIG. 1, system 100 may include one or more servers 102. Server(s) 102 may be configured to communicate with one or more client computing device 104 according to a client/server architecture. The users of system 100 may access system 100 via client computing devices(s) 104. Server(s) 102 may be configured to execute one or more computer program components. The computer program components may include one or more of geolocation component 106, user component 108, incident component 110, contextual component 112, determination component 114, presentation component 116 and/or other components.

Geolocation component 106 may be configured to obtain geolocation information for the likelihood of incident occurrence. Geolocation information may include determination of a real-world position or geographic location of a user. Geolocation component 106 may be configured to use client computing device 104 to determine a geographical location of a user based on one or more of signal strength, GPS, cell tower triangulation, Wi-Fi location, receipt of real-world location from server 106, and/or other input. In some implementations, user movements may be tracked using a geography based transmitter on client computing device 104. For example, a user may have arrived to New York City by landing at the John F. Kennedy airport. User's first location may be obtained as a 3-mile radius area surrounding the airport. Next, user may take a taxi cab to user's hotel in midtown Manhattan. User's second location may be obtained using client computing device 104 as a 3-mile radius area surrounding New York Hilton Hotel Midtown. In some implementations, geolocation component 106 may receive user input referring to a future user location. Future location may be a location user is intending on visiting sometime at a later time on the same date. For example, user staying in a hotel in midtown Manhattan may be attending a concert later that night. Geolocation component 106 may be configured to obtain user location as the area surrounding the concert venue as provided by the user. Future location may be a location user is intending on visiting sometime at a later date. For example, user may be traveling to a medical device convention to Cleveland, Ohio during last week of May. Geolocation component 106 may be configured to obtain user location as the convention center in Cleveland, Ohio as entered by the user. In some implementations, geolocation component 106 may be configured to obtain user's speed and/or direction of traveling. For example, user may be in in a motor vehicle using an interstate and moving at a particular speed which may be obtained by geolocation component 106. Future location may be obtained using user's speed and/or direction of traveling. For example, user may be in in a motor vehicle traveling north on interstate 5 from Irvine, Calif. at a speed of 80 mph. Geolocation component 106 may be configured to obtain future user location as Santa Ana, Calif. as it is the next city on user's way.

User component 108 may be configured to obtain user demographic characteristics. User demographic characteristics may include user's age, sex, race, national original, religion, marital status, family status, sexual orientation, height, weight, occupation, career, education level, interests, hobbies and/or other characteristics. User component 108 may be configured to obtain user demographic characteristics as stated information from the user, from an administrator, obtained from analysis of publicly available information associated with the user (e.g., public records, social media, and/or other sources), determined based on behavioral and/or demographic information related to the user, and/or other sources of demographic characteristics. For example, the user may enter user demographic characteristics directly from the user via user's input into client computing device 104. In some implementations, user component 108 may be configured to obtain user demographic characteristics from online public content. An online public content may include one or more of an online video content, a social media content, an online photo content, audio content, and/or other online public content. An online platform may include a networking platform a media platform, and/or other online platforms. The online platform may include the online public content and/or make the online public content available for consumption. For example, an online platform may include YOUTUBE, FACEBOOK, TWITTER, PINTEREST, LINKEDIN, FOURSQUARE, GOOGLE+, FLICKR, TUMBLR, BLOGGER, VINE, INSTAGRAM, SNAPCHAT, MAKER.TV and/or other online platforms. For example, user may input into system 100 their name, age, and race. Using the online public content, user component 108 may obtain data that specific user, based on photo content, prefers a style of dress associated with a known athletic team/has extravagant accessories/flashy/wears hoodies, etc.

In some implementations, user component 108 may be configured to obtain user supplemental information such as user medical record, including medical history and medication use, user driving record, user arrest record, user vaccination record, user gun ownership record, user financial record, and/or other supplemental information. User component 108 may be configured to obtain user supplemental information directly from the user via user's input into client computing device 104.

User component 108 may be configured to obtain user behavioral information at a geographic location. User behavioral information may include information about user activities both online and offline. For example, user's online behavior may include sites visited, apps downloaded, or games played. User's offline behavior may include venues visited, mode of transportation used, speed of traveling, among other. User behavioral information may be determined based on input obtained from user's schedule and/or user's calendar events. For example, user's calendar may include entries related to user attending a weekly company sponsored softball practice event. User behavioral information may include attendance of a weekly softball practice during the relevant time period.

User component 108 may be configured to obtain user social information. Social information may include information related to user's profile stored in connection with user's account with a social networking system. User profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. In some implementations, a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile. The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page. User's profile may contain information about user's events that are attended by the user or user's contacts.

User component 108 may be configured to obtain user's biometric information for the geolocation. Biometric data may be data describing a measurement of vital statistics of the user over a given period of time, a set of physiological responses of the user, and/or other data. The vital statistics of the user may include a heart rate, respiratory rate, and/or blood pressure. The set of physiological responses may include, without limitation, heart rate, pupil dilation, respiration, blood pressure, body temperature, rate of perspiration, and/or voice stress for the voice of the user. Biometric data may be received from a set of biometric sensors associated with client computing platform 104. For example, a health and fitness tracking devices equipped with biometric sensors may be used to provide biometric data. In another implementation, user component 108 may be configured to obtain a change in a biometric reading associated with the user is compared with a threshold or baseline reading of the same user.

User component 108 may be configured to obtain information about other users and/or animals that may be present with the user at a certain geographic location at a time of determining likelihood of incident occurrence. For example, user may be at a certain geographic location alone or accompanied by user's spouse, parents, children, or friends. In some implementations, the information regarding user's family members may be gathered using user demographic, user behavioral, user social and/or other information. For example, user may be in a theme park with his 2-year-old. System 100 may determine/obtain information including age, sex, and hobbies of the child using user social information, user behavioral information, and/or other information. A user may be accompanied by a friend that has written anti-governmental posts on user's FACEBOOK and have a hobby of visiting gun ranges. User may not share the same conspiracy theories as his friend, the information obtained about user's friend with may be used by System 100.

User component 108 may be configured to obtain information associated with individual users. Information may be stored by server(s) 102, client computing platforms 104, and/or other storage locations.

Incident component 110 may be configured to obtain historical incident information for incidents that have previously occurred at or near user geographic location. Historical incident information may include information about incidents that have previously occurred at or near user geographic location including frequency of occurrences, duration, outcome, demographic information of those involved, time(s) of occurrence, and/or other specific information characterizing historical incidents. Incident component 110 may be configured to obtain historical incident information from a variety of sources. Incident component 110 may be configured to obtain historical incident information as stated information from the user, from an administrator, obtained from analysis of publicly available information associated with the geographic location (e.g., public records, social media, and/or other sources), and/or other sources of historical incident information. For example, historical incident information may include information relating to one or more of crime, mortality, injury, morbidity rates, and/or other phenomena. Historical incident information may be obtained from one or more of local law enforcement agency, local Departments of Motor Vehicles, national security agency such as the Federal Bureau of Investigation, intelligence agency such as the Central Intelligence Agency, international criminal policy organization such as Interpol, national public health agency such as Center for Disease Control, international public health agency such as World Health Organization, subject matter expert, and/or other sources. For example, a general criminal activity rate for a geographic location may represent all criminal acts that have occurred in that location. A criminal activity rate may include violent and non-violent crimes, crimes against the person and/or property, and so on. A general mortality rate may include death from murder, morbidity rate, and death from natural causes. In some implementations, incident component 110 may be configured to prioritize or rate the obtained historical incident information based on individual user information. For example, morbidity rate at a geographic location including a hospital may be more relevant for a user over 65 years old currently being hospitalized than a healthy 35-year-old that exercises regularly. In some implementations, historical incident information may include data relating to crime, mortality, injury, morbidity rates and may be obtained from proprietary data sets.

Contextual component 112 may be configured to obtain contextual information describing events occurring at or near user geographic location. Contextual information may include information about events that have previously occurred at or near user geographic location. Contextual information may include information about events that occur on an individual basis. A one-time political demonstration occurring at a certain geographic location may be one such example of an event occurring on an individual basis. Contextual information may include information about events that occur periodically, regularly, and/or sporadically. For example, a baseball game that takes place every other Tuesday during the months of April through October is an event occurring periodically, a commuter train that arriving every morning at 8:30 is a regularly occurring event, and a unscheduled road hazard repair is a sporadically occurring event. Contextual information may vary in its specificity and its semantic content based on the user demographic information, user behavior information, and geographic location. For example, contextual information regarding a bachelor party celebration at a certain bar may be relevant to a user that is currently located in the bar and who in the past was arrested for an assault during a bar altercation. Conversely, a bachelor party celebration at a certain bar may not be relevant to a user that is attending a symphony performance during the same time at a nearby symphony hall. Contextual component 112 may be configured to obtain contextual information from a variety of sources. Contextual component 112 may be configured to obtain contextual information as stated information from the user, from an administrator, obtained from analysis of publicly available information associated with the geographic location (e.g., public records, social media, and/or other sources), determined based on behavioral and/or demographic information related to the user, and/or other sources of contextual information. For example, contextual information may be obtained from local, national, and international news aggregation engines, local and municipal agencies, mass-transit schedules, motor vehicle traffic data, local, national, and international weather reports, natural hazards programs, online public content and/or other sources. An online public content may include one or more of an online video content, a social media content, an online photo content, audio content, and/or other online public content. An online platform may include a networking platform a media platform, and/or other online platforms. The online platform may include the online public content and/or make the online public content available for consumption. For example, an online platform may include YOUTUBE, FACEBOOK, TWITTER, PINTEREST, LINKEDIN, FOURSQUARE, GOOGLE+, FLICKR, TUMBLR, BLOGGER, VINE, INSTAGRAM, SNAPCHAT, MAKER.TV and/or other online platforms. In some implementations, contextual component 112 may be configured to obtain contextual information from proprietary data sets.

Figure 2:
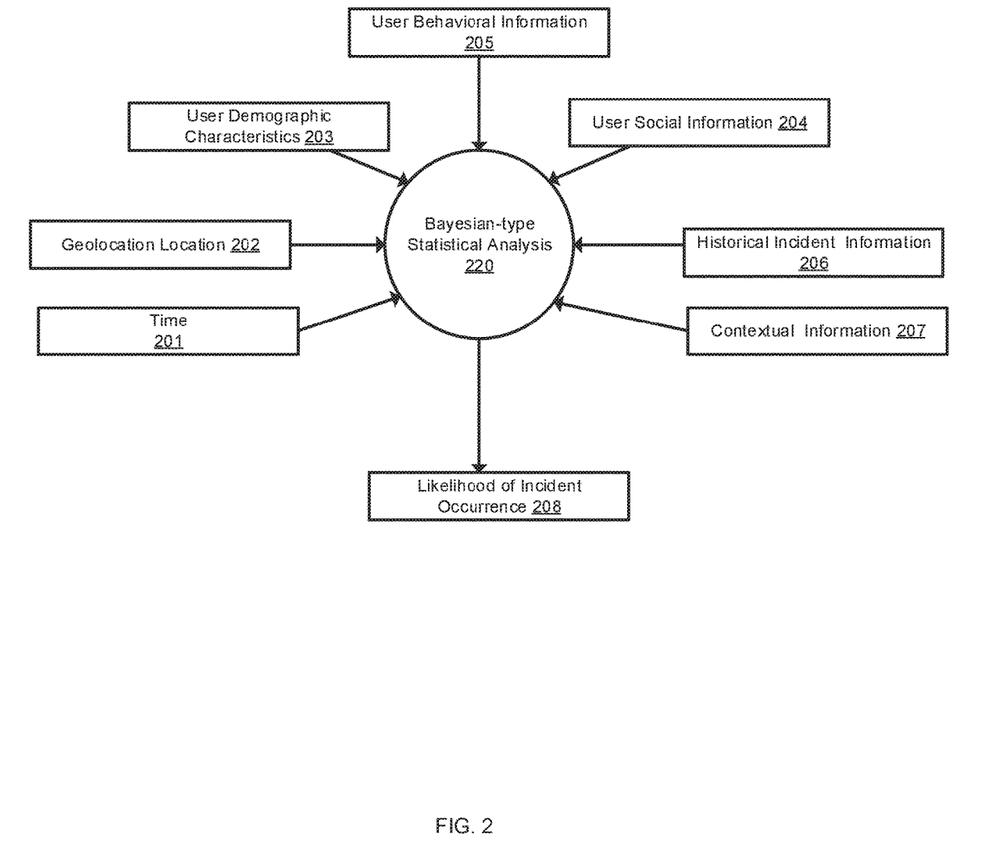
FIG. 2 illustrates an exemplary determination analysis utilizing geographic location, user demographic information, user behavioral information, user social information, historical incident information, contextual information, in accordance with one or more implementations.

Determination component 114 may be configured to determine a likelihood of incident occurrence for a user at a certain geographic location by analyzing information obtained by geolocation component 106, user component 108, incident component 110, and contextual component 112. Information obtained by geolocation component 106 may include time of determination, user's geographic location, speed of travel, and other information. Information obtained by user component 108 may include user's demographic characteristics including user behavioral information, user social information, and other information pertaining to the user. User demographic characteristics may include user's age, sex, marital status, height and weight, occupation, and other such characteristics. User behavioral information may include information regarding user activities at the geographic location (e.g., celebrating friend's birthday at a restaurant). User social information may include data related to user's profile stored in connection with user's account with a social networking system such as Facebook. User social information may include information related to user hobbies and preferences, recent public posts, interactions with other members within the social networking system. Information obtained by incident component 110 may include information related to historical incidents that have previously occurred at or near user's geographic location. Historical incident information may include historical incidents that previously occurred at or near user's geographic location and may have had certain effects on certain population group therein. Historical incident information may include crime statistics, health and safety information, traffic information, and/or other information obtained based on user information. Information obtained by contextual component 112 may include information about events that are occurring, previously occurred, or will occur within a relevant time frame, at or near user's current geographic location obtained based on user information. For example, in the determination analysis shown in FIG. 2, the analysis may include a Bayesian-type statistical analysis 220 performed at time 201 on user geographic location information 202 obtained from user's phone, user generated demographic information 203, user social data 204 including data from user accounts on Facebook and Twitter, user's schedule and other user behavioral information 204, relevant historical incident data 206, and contextual information 207. Time 201 may be 8:30 PM. Geographic location 202 may be a 3-mile radius around a bar located in the Lower Manhattan neighborhood of New York City. User demographic characteristics 203 may include a 23-year-old, Caucasian, female, who recently became unemployed. User social information 204 may include video and photo information that may be used to determine that user often engages in late night bar hopping and is newly single. User behavioral information 205 may include information that user is within a block from her house. Historical incident information 206 may include information from both law enforcement sources and social networking sites relating to high incidents of rape reported at the bar that user is currently located at. Contextual information 207 may include information that most of rape incidents reported were reported occurring after 2 AM. Determination analysis 220 may determine likelihood of incident occurrence 208 to be 25 in 100,000 at time 201 at geographic location 202 for user having user demographic characteristics 203, user social information 204, user behavioral information, historical incident information 206, and contextual information 207.

Referring back to FIG. 1, the determination analysis performed by determination component 114 may be configured to utilize a variety of analytical techniques to analyze collected sets of user data, historical incident data, and contextual information obtained from various sources to create a single incidence likelihood indicator. Determination component 114 may be configured to determine a likelihood of incident occurrence using Bayesian-type statistical analysis to calculate the incidence likelihood indicator. Determination component 114 may be configured to assign specificity, relevance, confidence and/or weight to every one of geographic information, user information, historical incident information, and contextual information based on the relevance and relationship between each piece of information to one another. The assignment of these weight factors may be used in determination of user-specific likelihood results. For example, during a likelihood determination a higher weight may be given to an increased incidence of assaults of young females in neighborhood bars when a user is a young female planning on visiting one of the neighborhood bars as when a user is a young male planning on visiting one of the neighborhood bars.

In some implementations, incomplete data sets may be obtained. Bayesian network model may provide statistical validity to determination analysis and hierarchically apply relevant data in 'best available' model. For example, access to national level homicide and violent crime victimization rates only may be available in Guatemala. No demographic information about the victims or details about the geolocation of crimes may be available. A subsequent study published by a local academic institution may provide additional victimization data from the analysis of crimes limited to the urban areas of Guatemala City. The study may include more current data, demographic information about victims, and specific geolocation information within a city-block level accuracy about the incidents. This additional information may be used to compound and/or supersede the currently available crime data, and may be used to determine a likelihood of incidence for certain individuals within the geographical location of Guatemala City and/or other locations. In some implementations, this additional information may be used to compound and/or supersede the currently available crime data, and may be used to determine a likelihood of incidence including a type of incident, for certain individuals within the geographical location of Guatemala City and/or other locations.

In some implementations, determination component 114 may be configured to assign specificity, relevance, confidence and/or weight to every one of geographic information, user information, historical incident information, and contextual information based on the source of the information. The selection of these weighting factors may be used to augment the predictive power of the likelihood determination analysis. For example, more established and highly frequented social network sites may be associated with a higher credibility factor, while newer, less established sites may be associated with a relatively lower credibility factor. A higher weight factor may be assigned to a post about an upcoming political rally by a well-known activist group using a popular social network site than a post by an individual with no history of activism or known affiliation with the group.

In some implementations, user information, historical incident information, contextual information and/or other information may be used in conjunction with one or more predictive models. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. The specific information analyzed may vary depending on the desired functionality of the particular predictive model.

Determination component 114 may be configured to determine a location-based likelihood indicators associated with the individual users based upon user information, historical incident information, and relevant contextual information. The likelihood indicators may quantify a likelihood of negative incident occurrence to individual users at a certain geographic location (e.g., a bar, a city street). The likelihood indicators may be determined based upon the relevant information including one or more of demographic information, behavioral information, social information, biometric information, supplemental information, historical incident information, relevant contextual information, and/or any other information related to the user, user's geographic location, and the time of user presence at geographic location. Likelihood indicators may be a sliding scale of percentile values (e.g., 10%, 15%, . . . n, where a percentage may reflect likelihood of incident occurrence), numerical values (e.g., 1, 2, . . . n, where a number may be assigned as low and/or high), verbal levels (e.g., very low, low, medium, high, very high, and/or other verbal levels), and/or any other scheme to represent a confidence score. Individual likelihood indicators may have one or more likelihood indicators associated with it. An aggregate likelihood indicator for a user at a large geographic location may represent a likelihood of incident occurrence over multiple smaller geographic locations comprising the larger area. The aggregate likelihood indicator may be determined based on a combination of likelihood indicators associated with the individual locations and the information associated with the user at each location, and/or other basis.

In some implementations, the likelihood indicators may quantify a likelihood of occurrence of certain types of negative incidents to individual users at a certain geographic location. For example, the likelihood indicators may quantify a likelihood of certain negative incidents (e.g., assault, battery, theft, etc.) occurrence to individual users at a certain geographic location (e.g., a bar, a city street).

Determination component 114 may be configured to iteratively update a likelihood indicator for individual user at a certain geographic location (e.g., periodically, based on recurring triggering event(s), and/or at other intervals). System 100 may be configured to continue determining and/or obtaining user information, historical incident information, and contextual information utilized by determination component 114 to re-analyze and determine updated likelihood of incident occurrence based on updated user information, historical incident information, contextual information, and/or other information within a certain time interval. For example, a user may receive a likelihood indicator of 25% at a certain location based on the information analyzed by System 100 at a first time period. The same user in the same location may receive a likelihood indicator of 35% based on the information analyzed by System 100 at a second time period. The change in likelihood of incident occurrence may be related to a change in user information, historical incident information, contextual information, and/or other information utilized by determination component 114 in determining likelihood indicator.

In some implementations, determination component 114 may be configured to iteratively update a likelihood indicator based on a change in user's geographic location. For example, a user may be traveling from one destination to the next. System 100 may be configured to continue determining and/or obtaining user information, historical incident information, and contextual information utilized by determination component 114 to re-analyze and determine updated likelihood of incident occurrence based on updated user information, historical incident information, contextual information, and/or other information at each geographic location the user is present. For example, a user may receive a likelihood indicator of 25% at a first location based on the information analyzed by system 100. The same user in a second location may receive a likelihood indicator of 15% based on the information analyzed by System 100. The change in likelihood of incident occurrence may be related to a change in user information, historical incident information, contextual information, and/or other information utilized by determination component 114 in determining likelihood indicator at a second location.

Presentation component 116 may be configured to effectuate presentation of an incidence likelihood indicator to the user, the incidence likelihood indicator reflecting the likelihood of incident occurrence for the geolocation and the user. Presentation component 116 may be configured to use client computing device(s) 104 to present the incidence likelihood indicator to the user. In some implementations, client computing device(s) 104 may include one or more of a smartphone, a tablet, a mobile device, and/or other displays. A given client computing device 104 may include one or more processors configured to execute computer program components. The computer program components may be configured to enable a user associated with the given client computing device 104 to interface with system 100 and/or external resources 120, and/or provide other functionality attributed herein to client computing device(s) 104.

Figure 3:
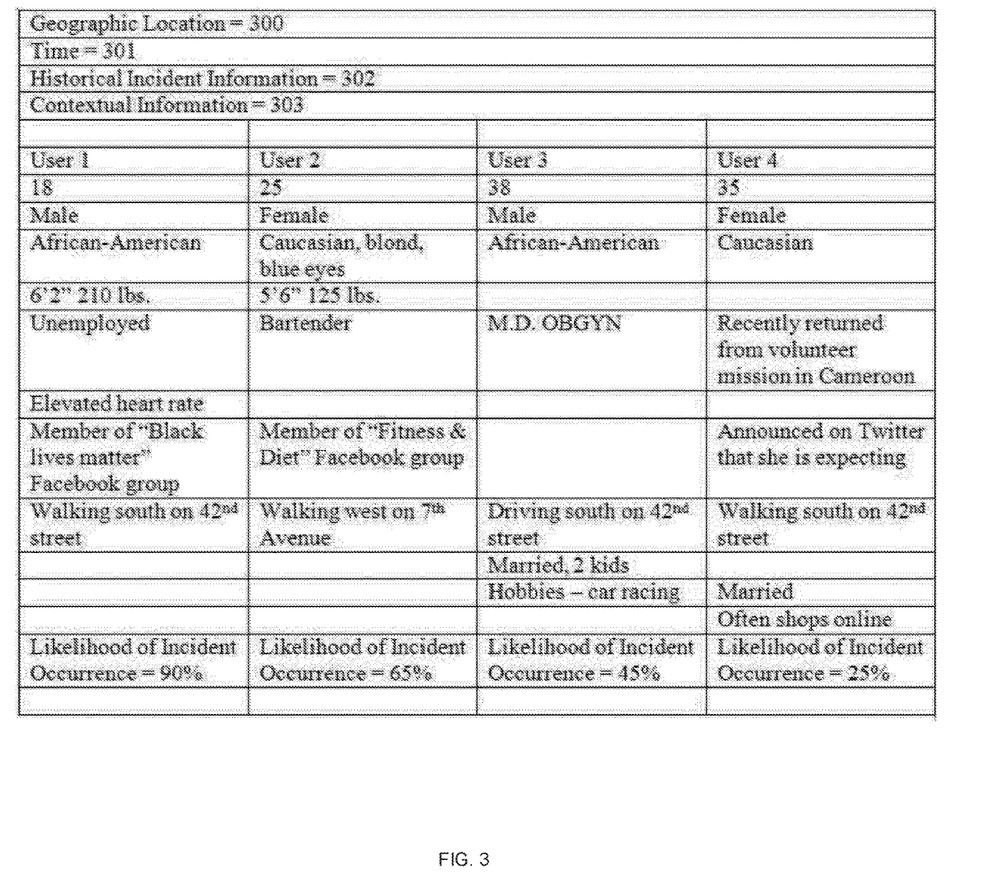
FIG. 3 illustrates an exemplary schematic of an implementation of the system of FIG. 1, in accordance with one or more implementations.

Referring to FIG. 3, four users, 1-4, at geographic location 300 at time 301 are shown. System 100 via geolocation component 106 of FIG. 1, may determine and/or obtain geolocation information relating to geographic location 300 including a New York City block located on $42^{nd}$ Street between $7^{th}$ and $8^{th}$ Avenue. System 100 via user component 108 of FIG. 1, may determine and/or obtain user information relating to each of the four users. User information obtained for individual user may include user demographic information, user behavioral information, user social information, user biometric information. User information obtained for user 1 including that user 1 is an 18 year old African-American male, 6'2 tall, weighing 210 lbs., unemployed, a member of the "Black Lives Matter" social media group, has a YouTube channel to which he posts amateur rap videos, his contact on Facebook posted a "wall post" about stop & frisk policy, his heart rate is elevated as compared to his baseline heart rate, and he is currently walking south on $42^{nd}$ Street. User information obtained for user 2 including that user 2 is a 25-year-old Caucasian female, 5'6" 125 lbs., blonde, blue eyed, employed as a bartender, enrolled in a creative writing course, is scheduled to work later tonight, has recently entered a "Fitness & Diet" group on Facebook, and she is currently walking west on 7th Avenue. User information obtained for user 3 including that user 3 is a 38-year-old African-American male, working as an obstetrician at a local hospital, married, has 2 kids, is a car racing enthusiast, and is currently driving south on $42^{nd}$ Street. User information obtained for user 4 including that user 4 is a 35-year-old female, married, has announced that she is expecting via her Twitter account, has recently returned from a volunteer mission in Cameroon, tends to do most of her shopping online, and he is currently walking south on $42^{nd}$ Street.

System 100 via incident component 110 of FIG. 1, may determine and/or obtain historical incident event information 302 relating to incidents that have previously occurred at or near geographic location 300. Historical incident information 302 obtained for geographic location 300 may include reports by national law enforcement agency of higher than national average rates of auto theft, robbery, larceny, identity theft, rape, and food related poisoning. System 100 via contextual component 112 of FIG., may determine and/or obtain contextual information 303 relating to events occurring at or near geographic location 300. Contextual information 303 may include information of regular police patrol at or near time 301 at or near geolocation 300, an eyewitness report on social media of a convenience store robbery at gunpoint by an African-American male at or near geolocation 300 within the last hour, a local news interview of 5 owners who had their luxury sports cars stolen at or near geolocation 300 within last week, Facebook posts by users that checked into a coffee shop at geolocation 310 and have reported 3 incidents of identity theft and 2 incidents of stolen laptop computer within the last 3 months, local news interviews with 3 rape victims that were assaulted at or near geolocation 300, 2 of which were blond and blue eyed, a scheduled arrival of a flight from Senegal using a Port Authority stop for an airport bus located at or near geolocation 300, a New York Sanitation report that found disease causing bacteria in an apple pie sold by many local cafes, a Latin-American business convention that started the day before time 301 with some events taking place at or near geolocation 300, a church organized anti-abortion picket at or near geolocation 300, and reports of high winds and rain within 30 minutes of time 301 at geolocation 300. System 100 may rate historical incident information 302 and contextual information 303 in terms of applicability, significance, and weight based on individual user information to determine a highly individualized incidence occurrence indicator.

At first pass, historical incident information of higher than national average crime and health and safety statistics may imply a high likelihood of incidence to all the users. System 100 may determine that at geolocation 300 at time 301, not all the users will have the same likelihood of incident occurrence. User 1 may have a 90% likelihood of incident occurrence because of the historical incident events and contextual information evaluated within the framework of user 1 characteristics. For example, higher weight may be assigned to such information as recent robbery by African-American male, whose physical description closely matches that of user 1, user 1's support of anti-police rhetoric, elevated heart rate after reading a negative comment may indicate he may resist potential police questioning. User 2 may have a 65% likelihood of incident occurrence because of the historical incident events and contextual information evaluated within the framework of user 2 characteristics. For example, higher weight may be assigned to such information as recent reports of rape of similarly looking victims as user 2, reports of stolen laptops in coffee shops, given the fact that user 2 will likely be using her laptop to finish her creative writing assignment in a coffee shop to which she is most likely walking to as she is not near her home or work. User 3 may have a 45% likelihood of incident occurrence because of the historical incident events and contextual information evaluated within the framework of user 3 characteristics. For example, higher weight may be assigned to such information as reports of stolen luxury sports cars, given the fact that user 3 is currently driving a luxury sports car, an influx of tourists from Senegal that may potentially carry viruses like Malaria for which user 3 has not been vaccinated, an encounter with an anti-abortion picket given that user 3 has likely performed birth terminating procedures during his practice. User 4 may have a 25% likelihood of incident occurrence because of the historical incident events and contextual information evaluated within the framework of user 4 characteristics. For example, higher weight may be assigned to such information as a near buy convention of business people from Latin America given that they may potentially carry a virus that is known to cause birth defects, incidents of food poisoning related to ingestion of apple pie given that bad weather may likely force user 4 into a near-by coffee shop where pregnant user 4 may potentially order a slice of apple pie, and reports of identity theft given that user 4 tends to pay with a credit card for all her purchases. These examples are not meant to be a limitation of this disclosure, as likelihood of incident occurrence may be associated with information resulting in a higher and/or lower likelihood of incident occurrence based upon various other factors.

Referring back to FIG. 1, determining the likelihood of incident occurrence for a user may be based upon a future destination a user intends to visit. A future destination may include a geographic location that user inputs into System 100. In some implementations, geolocation component 106 may be configured to obtain user geographic location from the user's calendar. A user's calendar may include one or more of a calendar associated with client computing device 104, a publicly available calendar associated with user's social media profile, a private calendar associated with a third-party application that stores user's schedule data, and/or other calendars. A future destination may include a geographic location determined and/or obtained by geolocation component 106 using a geographic location associated with an entry on user's calendar. Incident component 110 may be configured to obtain historical incident information for incidents that have previously occurred at or near user's future geographic location. Incident component 110 may be configured to obtain historical incident information from a variety of sources. User component 108 may be configured to obtain user demographic characteristics. User component 108 may be configured to obtain user behavioral information at a future geographic location. User component 108 may be configured to obtain user social information. User component 108 may be configured to obtain user supplemental information. User component 108 may be configured to obtain user biometric information. User component 108 may be configured to obtain information about other users and/or animals that may accompany user at future geographic location. Contextual component 112 may be configured to obtain contextual information describing events occurring at or near future user geographic location. Determination component 114 may be configured to determine a likelihood of incident occurrence for a user at a future location by analyzing information obtained by geolocation component 106, user component 108, incident component 110, contextual component 112.

System 100 may be configured to track likelihood of incident occurrence at a particular geographic location. Tracking the likelihood of incident may include one or more of tracking likelihood of incident occurrence for all users as an aggregate indicator, tracking likelihood of incident occurrence for all users of specific demographic population, tracking the accuracy of the determination of likelihood of incident occurrence for all users as an aggregate indicator, tracking the accuracy of the determination of likelihood of incident occurrence for all users of specific demographic population, tracking user responses to an incident occurrence for all users as an aggregate indicator, tracking user responses to an incident occurrence for all users of specific demographic, tracking whether users that have experienced an adverse incident determined by System 100 subsequently return to the geographic location at which likelihood of incident occurrence is substantial.

System 100 may be configured to track likelihood of incident occurrence at a particular geographic location for a particular user. Tracking the likelihood of incident occurrence may include one or more of tracking likelihood of incident occurrence, tracking the accuracy of the determination of likelihood of incident occurrence, tracking user response to an incident occurrence, tracking whether user that has experienced an adverse incident determined by System 100 subsequently returns to the geographic location at which likelihood of incident occurrence is substantial.

Presentation component 116 may be configured to effectuate presentation of an incidence likelihood indicator related to a certain user at a certain geographic location to additional users. Presentation component 116 may be configured to effectuate presentation of an incidence likelihood indicator based on a change in a likelihood of incidence related to a certain user at a certain geographic location to additional users. In some implementations, system 100 may alert law enforcement and/or other users if the likelihood of incident occurrence for a user or a population of users at a certain geographic location exceeds a predetermined threshold value. For example, a parent may receive an alert that their child's activities result in a 10% increase in a likelihood of incidence.

Referring again to FIG. 1, in some implementations, server(s) 102, client computing platform(s) 104, and/or external resources 120 may be operatively linked via one or more electronic communication links. For example, such electronic communication links may be established, at least in part, via network(s) 119 such as the Internet and/or other networks. The network(s) 119 may comprise one or both of wired or wireless communications. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, 114 and 116 are illustrated in FIG. 1 as being co-located within a single processing unit, in implementations in which processor(s) 124 includes multiple processing units, one or more of components 106, 108, 110, 112, 114 and 116 may be located remotely from the other components. The description of the functionality provided by the different components 106, 108, 110, 112, 114 and/or 116 described herein is for illustrative purposes, and is not intended to be limiting, as any of components 106, 108, 110, 112, 114 and/or 116 may provide more or less functionality than is described. For example, one or more of components 106, 108, 110, 112, 114 and/or 116 may be eliminated, and some or all of its functionality may be provided by other ones of components 106, 108, 110, 112, 114 and/or 116. As another example, processor(s) 124 may be configured to execute one or more additional components that may perform some or all of the functionality attributed herein to one of components 106, 108, 110, 112, 114 and/or 116.

Figure 4:
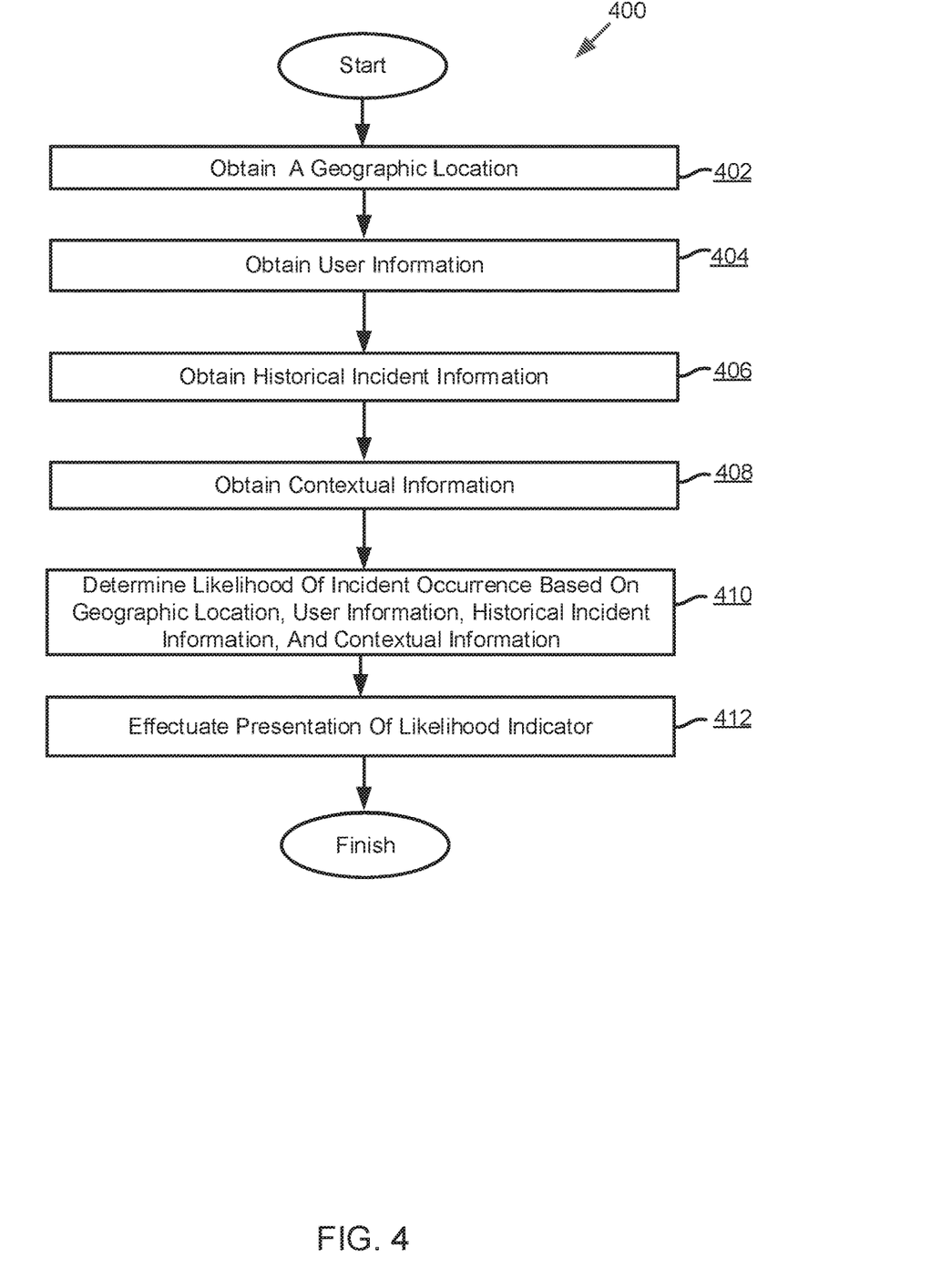
FIG. 4 illustrates a method for determining a likelihood of incident occurrence for a user at a geographic location, in accordance with one or more implementations.

FIG. 4 illustrates a method 400 for determining a likelihood of incident occurrence for a user at a certain geographic location, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, geographic information of the incident occurrence determination may be obtained. Geographic information may include information describing the user location. Operation 402 may be performed by a geolocation component that is the same as or similar to content component 106, in accordance with one or more implementations.

At an operation 404, user information associated with the user present at geographic location may be obtained. User information may include user demographic information, user behavioral information, user social information, user supplemental information, user biometric information, and/or other information. Operation 404 may be performed by a user component that is the same as or similar to user component 108, in accordance with one or more implementations.

At an operation 406, historical incident information associated with the geographic location may be obtained. Historical incident information may include data relating to crime, mortality, injury, morbidity rates, and/or other information. Operation 406 may be performed by an incident component that is the same as or similar to incident component 110, in accordance with one or more implementations.

At an operation 408, contextual information associated with the geographic location may be obtained. Operation 408 may be performed by a contextual component that is the same as or similar to contextual component 112, in accordance with one or more implementations.

At an operation 410 a likelihood of incident occurrence for a user at geographic location may be determined. The likelihood of incident occurrence may quantify a likelihood of a negative incident occurrence to user at a certain geographic location. The determination may be based upon the geographic location, user information, historical incident information, and/or contextual information. Operation 410 may be performed by a determination component that is the same as or similar to determination component 114, in accordance with one or more implementations.

At an operation 412 a likelihood of incident occurrence indicator may be presented to the user. Operation 412 may be performed by a presentation component that is the same as or similar to presentation component 116, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing access to incident information, the system comprising:
one or more physical processors configured by machine-readable instructions to:
obtain user information, the user information including demographic information of a user, geolocation information of the user, and activity information of the user, such that the demographic information indicating demographic characteristics of the user, the geolocation information indicating geolocations of the user over time, and the activity information indicating at least one activity being performed by the user at or near the geolocation of the user, wherein the geolocations are based on user movement of the user such that the geolocation information indicates the user at a first geolocation and subsequently a second geolocation different from the first geolocation;
obtain historical incident information for incidents that have previously occurred at or near the geolocations as the user moves to the geolocations;
determine, in an ongoing manner, a likelihood of occurrence of an incident that negatively impacts the safety and/or security of the user for individual ones of the geolocations and the user based upon the user demographic characteristics, the activity information, and the historical incident information as the geolocations change based on the user movement such that
a first likelihood of occurrence of an incident is determined based on the historical incident information for the first geolocation of the user and subsequently a second likelihood of occurrence of an incident is determined based on the historical incident information for the second geolocation of the user; and
effectuate presentation of incidence likelihood indicators to the user, the incidence likelihood indicators reflecting the likelihood of occurrence of an incident that negatively impacts the safety and/or security of the user for the geolocations and the user such that presentation of a first incidence likelihood indicator reflecting the likelihood of occurrence of an incident for the user at the first geolocation is effectuated and presentation of a second incidence likelihood indicator reflecting the likelihood of occurrence of an incident for the user at the second geolocation is effectuated.

2. The system of claim 1, wherein the determination of the likelihood of occurrence of an incident that negatively impacts the safety and/or security of the user is determined using linear regression analysis.

3. The system of claim 1, wherein the one or more physical processors are further configured to obtain a query time at which the user is or will be present at the geolocation and wherein the determination of the likelihood of occurrence of an incident that negatively impacts the safety and/or security of the user for the geolocation is further configured to be based upon the query time.

4. The system of claim 3, wherein the one or more physical processors are further configured to obtain behavioral and social information of the user for the geolocation at the query time.

5. The system of claim 4, wherein the determination of the likelihood of occurrence of an incident that negatively impacts the safety and/or security of the user for the geolocation and the user is further configured to be based upon the behavioral and social information.

6. The system of claim 3, wherein the one or more physical processors are further configured to obtain contextual information for the geolocation, the contextual information describing events occurring at or near the geolocation at the query time.

7. The system of claim 6, wherein the events have previously occurred individually, periodically, regularly, and/or sporadically.

8. The system of claim 6, wherein the contextual information includes events related to natural or man-made hazards and disasters, states of emergency, political unrest, social unrest, and/or wars.

9. The system of claim 6, wherein the determination of the likelihood of occurrence of an incident that negatively impacts the safety and/or security of the user for the geolocation and the user is based upon the contextual information.

10. The system of claim 1, wherein the demographic characteristics include at least one or more of the user's age, sex, and/or race.

11. The system of claim 1, wherein the historical incident information includes at least one or more of a crime information, a victimization information, a health and safety information, and/or a climate information.

12. A method for providing access to incident information, the method comprising:
obtaining user information, the user information including user demographic information, user geolocation information, and user activity information, such that the user demographic information indicating demographic characteristics of the user, the user geolocation information indicating geolocations of the user over time, and the user activity information indicating at least one activity being performed by the user at or near the geolocation of the user, wherein the geolocations are based on user movement of the user such that the geolocation information indicates the user at a first geolocation and subsequently a second geolocation different from the first geolocation;
obtaining historical incident information for incidents that have previously occurred at or near the geolocations as the user moves to the geolocations;
determining, in an ongoing manner, a likelihood of occurrence of an incident that negatively impacts the safety and/or security of the user for individual ones of the geolocation and the user based upon the user demographic characteristics, the user activity information, and the historical incident information as the geolocations change based on the user movement such that a first likelihood of occurrence of an incident is determined based on the historical incident information for the first geolocation of the user and subsequently a second likelihood of occurrence of an incident is determined based on the historical incident information for the second geolocation of the user; and
effectuating presentation of incidence likelihood indicators to the user, the incidence likelihood indicators reflecting the likelihood of occurrence of the incident that negatively impacts the safety and/or security of the user for the geolocations and the user such that presentation of a first incidence likelihood indicator reflecting the likelihood of occurrence of an incident for the user at the first geolocation is effectuated and presentation of a second incidence likelihood indicator reflecting the likelihood of occurrence of an incident for the user at the second geolocation is effectuated.

13. The method of claim 12, wherein the determination of the likelihood of occurrence of the incident that negatively impacts the safety and/or security of the user is determined using linear regression analysis.

14. The method of claim 12, wherein the one or more physical processors are further configured to obtain a query time at which the user is or will be present at the geolocation and wherein the determination of the likelihood of occurrence of the incident that negatively impacts the safety and/or security of the user for the geolocation is further configured to be based upon the query time.

15. The method of claim 14, wherein the one or more physical processors are further configured to obtain behavioral and social information of the user for the geolocation at the query time.

16. The method of claim 15, wherein the determination of the likelihood of occurrence of the incident that negatively impacts the safety and/or security of the user for the geolocation and the user is further configured to be based upon the behavioral and social information.

17. The method of claim 14, wherein the one or more physical processors are further configured to obtain contextual information for the geolocation, the contextual information describing events occurring at or near the geolocation at the query time.

18. The method of claim 17, wherein the events have previously occurred individually, periodically, regularly, and/or sporadically.

19. The method of claim 17, wherein the contextual information includes events related to natural or man-made hazards and disasters, states of emergency, political unrest, social unrest, and/or wars.

20. The method of claim 17, wherein the determination of the likelihood of occurrence of the incident that negatively impacts the safety and/or security of the user for the geolocation and the user is, based upon the contextual information.

21. The method of claim 12, wherein the demographic characteristics include at least one or more of the user's age, sex, and/or race.

22. The method of claim 12, wherein the historical incident information includes at least one or more of a crime information, a victimization information, a health and safety information, and/or a climate information.

* * * * *